(12) United States Patent
Kraver

(10) Patent No.: US 8,395,618 B2
(45) Date of Patent: *Mar. 12, 2013

(54) METHOD OF CAPTURING, PROCESSING, AND RENDERING IMAGES

(75) Inventor: Adam Kraver, Scottsdale, AZ (US)

(73) Assignee: Captivemotion, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,825

(22) Filed: Jan. 7, 2011

(65) Prior Publication Data

US 2011/0102433 A1   May 5, 2011

Related U.S. Application Data

(63) Continuation of application No. 11/627,513, filed on Jan. 26, 2007, now Pat. No. 7,889,197.

(51) Int. Cl.
*G06T 17/00* (2006.01)
(52) U.S. Cl. ............ 345/420; 345/419
(58) Field of Classification Search ............ 345/420, 345/419
See application file for complete search history.

(56) References Cited

U.S. PATENT DOCUMENTS

2007/0206832 A1* 9/2007 Gordon et al. ............... 382/103

OTHER PUBLICATIONS

Guenter et al. "Making Faces" In Computer Graphics Proceedings SIGGRAPH'98, pp. 4-5, 1998.*

* cited by examiner

*Primary Examiner* — Maurice L McDowell, Jr.
(74) *Attorney, Agent, or Firm* — Quarles & Brady LLP

(57) ABSTRACT

A computer-implemented method of capturing and processing a series of images incorporating a plurality of digitized markers is presented. A position of a first digitized marker is located in a first image frame. A second, succeeding image frame is searched for the first digitized marker. When the first digitized marker is not found in the second, succeeding image frame, a best guess position of the first marker in the second, succeeding image frame is interpolated by processing translation information of a second marker geometrically interconnected to the first marker. The first image frame may be captured with a first video camera having a first optical position to generate a first image representation. The first image frame may be captured with a second video camera having a second optical position to generate a second image representation.

7 Claims, 17 Drawing Sheets

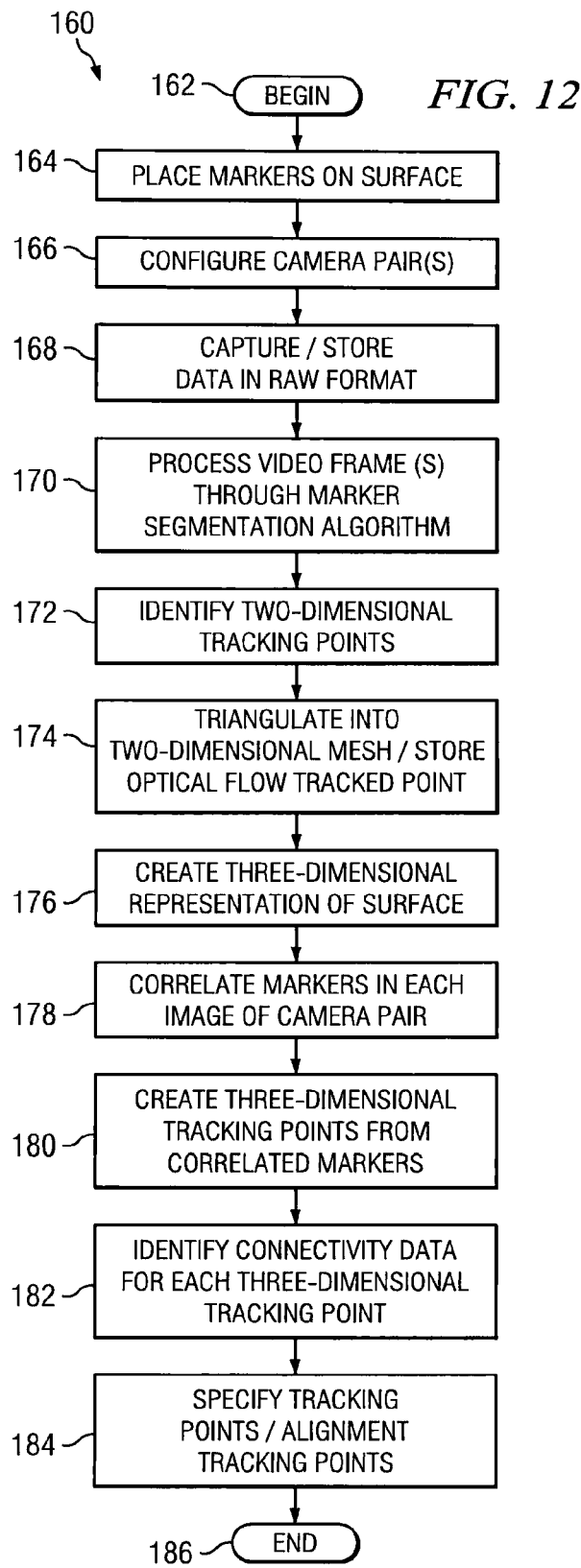

TO FIG. 13B

METHOD OF CAPTURING, PROCESSING, AND RENDERING IMAGES

CROSS-REFERENCE TO RELATED APPLICATIONS

This application is a continuation of, and claims priority to, U.S. application Ser. No. 11/627,513, filed on Jan. 26, 2007 now U.S. Pat. No. 7,889,197, titled "Method of Capturing, Processing, and Rendering Images," the entire contents of which are incorporated herein by reference.

FIELD OF THE INVENTION

The present invention relates in general to computer-aided image processing and, more particularly, to a system and method of capturing, editing and processing, and rendering images.

BACKGROUND OF THE INVENTION

Computers and computer software to perform image acquisition, image processing, and image rendering techniques have increasingly become common in today's digital world. For example, an increasing number of motion pictures, video, and games utilize image processing techniques to artificially render images. Computer-generated images are increasingly replacing conventionally obtained images, particularly in situations where special effects are warranted.

So-called "motion tracking" or "motion capture" began as an analysis tool in biomechanics research, and expanded into education, training, sports and recently computer animation for cinema and video games as the technology has matured.

In the current art, a performer wears markers near each joint to identify the motion by the positions or angles between the markers. Acoustic, inertial, LED, magnetic or reflective markers, or combinations of any of these, are tracked, optimally at least two times the rate of the desired motion, to submillimeter positions. The motion capture computer software records the positions, angles, velocities, accelerations and impulses, providing an accurate digital representation of the motion.

In entertainment applications, the application of motion tracking can reduce the costs of animation which otherwise requires the animator to draw each frame, or with more sophisticated software, key frames which are interpolated by the software. Motion capture saves time and creates more natural movements than manual animation. In biomechanics, sports and training, real time data can provide the necessary information to diagnose problems or suggest ways to improve performance, requiring motion capture technology to capture motions up to 140 miles per hour for a golf swing, for example.

Certain disadvantages also continue to pose problems for motion tracking technologies. For example, current algorithms and techniques often break down when applied to recreate human characteristics in computer-generated characters, resulting in "cartoon-like" reproductions. Moreover, current methods and techniques often result in poorer resolution and clarity than is desired, particularly when applied to humanistic features such as facial expressions and the like.

Thus, a need exists for a method of capturing, processing, and rendering images which provides increased resolution and clarity. In addition, a need exists for a method which implements various corrective "fixes" to promote greater resolution, clarity, and overall quality in reproduction.

SUMMARY OF THE INVENTION

In one embodiment, the present invention is a computer-implemented method of capturing and processing a series of images incorporating a plurality of digitized markers, comprising identifying a plurality of alignment tracking points from the plurality of digitized markers, and utilizing the plurality of alignment tracking points in a first image frame to locate a position of a first marker in a second, succeeding image frame, wherein if the first marker is identified, the first marker is reused in the second image frame, and if the first marker is not identified, searching a defined region surrounding the position of the first marker for a second, matching marker, the second, matching marker used in the second, succeeding image frame if the second, matching marker is identified within the defined region, and if the matching marker is not identified within the defined region, interpolating a best guess position of the first marker by processing translation information of a second marker geometrically interconnected to the first marker.

In another embodiment, the present invention is a computer-implemented method for capturing and processing a series of images, comprising capturing a first image incorporating a surface having a plurality of markers varying in texture or color to obtain an image representation, designating a plurality of alignment tracking points obtained from the plurality of markers, and utilizing the plurality of alignment tracking points in a first image frame to locate a position of a first marker in a second, succeeding image frame, the first marker reused in the second, succeeding image frame if located, wherein if the first marker is not located, searching a defined region surrounding the position of the first marker for a second marker matching the first marker in texture or color, the second marker used in the second, succeeding image frame if located within the defined region, and, if the second marker is not located within the defined region, interpolating a best guess position of the first marker by processing translation information of a third marker geometrically interconnected to the first marker.

In still another embodiment, the present invention is a computer program product comprising a computer usable medium including a computer usable program code for capturing and processing a series of images, said computer program product including computer usable program code for capturing a first image incorporating a surface having a plurality of markers varying in texture or color to obtain an image representation, computer usable program code for designating a plurality of alignment tracking points obtained from the plurality of markers, and computer usable program code for utilizing the plurality of alignment tracking points in a first image frame to locate a position of a first marker in a second, succeeding image frame, the first marker reused in the second, succeeding image frame if located, wherein if the first marker is not located, computer usable program code for searching a defined region surrounding the position of the first marker for a second marker matching the first marker in texture or color, the second marker used in the second, succeeding image if located within the defined region, and, if the second marker is not located within the defined region, computer usable program code for interpolating a best guess position of the first marker by processing translation information of a third marker geometrically interconnected to the first marker.

BRIEF DESCRIPTION OF THE DRAWINGS

FIG. 12 is a flow chart diagram of an example method of capturing and identifying tracking points according to the present invention;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A method of capturing, processing, and rendering a series of images can be implemented which serves to decrease the aforementioned problems associated with present capturing technologies. In addition, the method can produce images having increased contrast, clarity, and detail. When applied specifically to humanistic features, dramatic results can be achieved.

Figure 1:
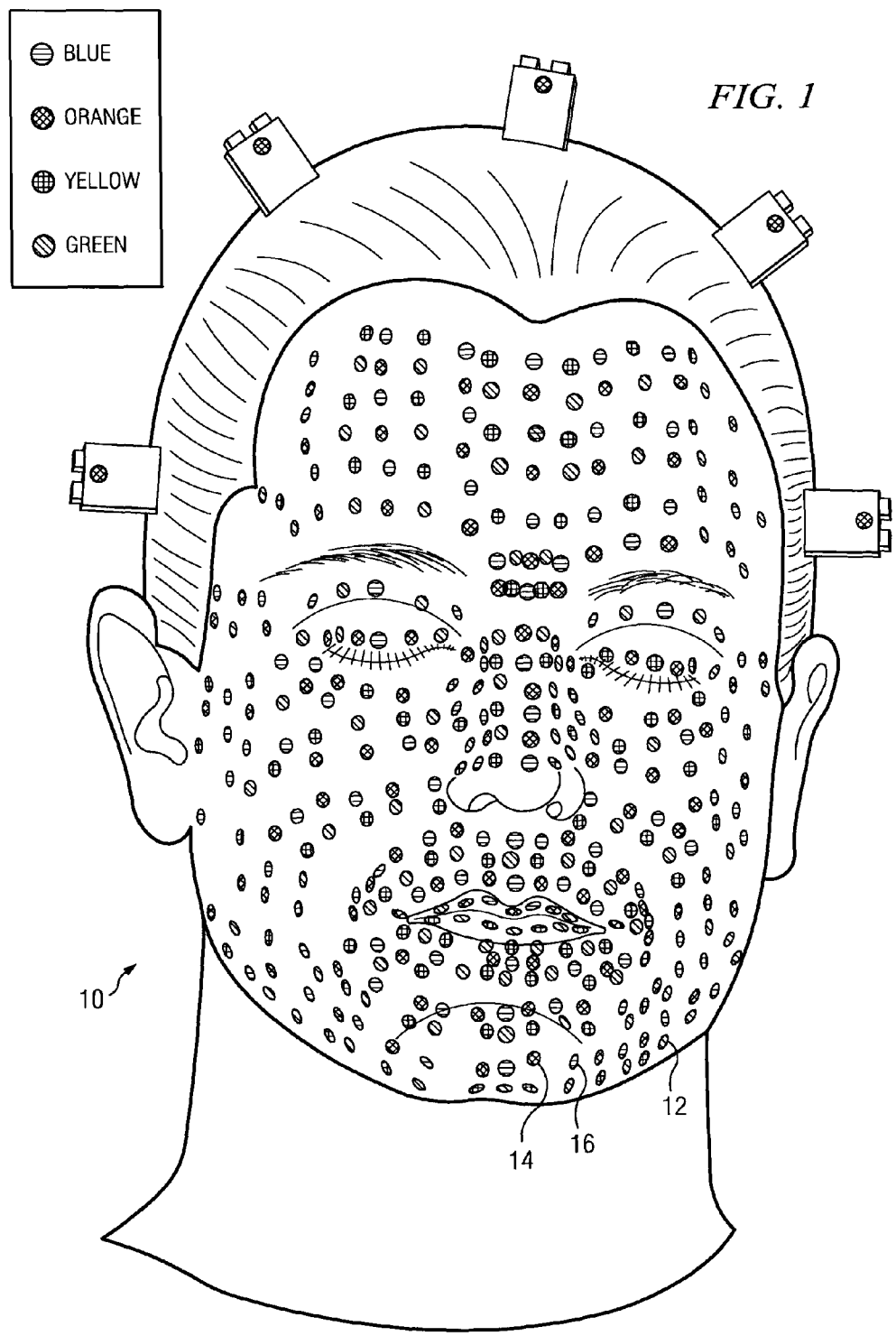
FIG. 1 illustrates a plurality of markers which are affixed to a surface.

FIG. 1 illustrates a plurality of markers 12, 14, and 16, which are affixed to a surface of a human face 10. Markers 12, 14, and 16 can be affixed, applied, connected, or otherwise associated with a surface 10 that is desired to be captured. For example, markers 12, 14, and 16 can be applied with paint or stickers. The markers 12, 14, and 16 can be composed of a wide variety of materials. For example, in applications involving skin, markers 12 can be applied to a water slide decal. The markers 12 are then applied to the skin using a thin layer of adhesive material.

In one embodiment, markers 12 on cloth surfaces 10 can be applied with dyes, iron-on transfers, paint, or stickers. In addition, the markers can be incorporated into the surface pattern of the cloth itself.

Visually, markers 12 can be provided in several varieties of textures and/or colors. In one embodiment, the markers 12 can include a filled circle-shaped marker 12 having a variety of solid colors. In another embodiment, the markers 12 can include patterns such as a checkerboard pattern having a variety of colors.

Figure 2A:
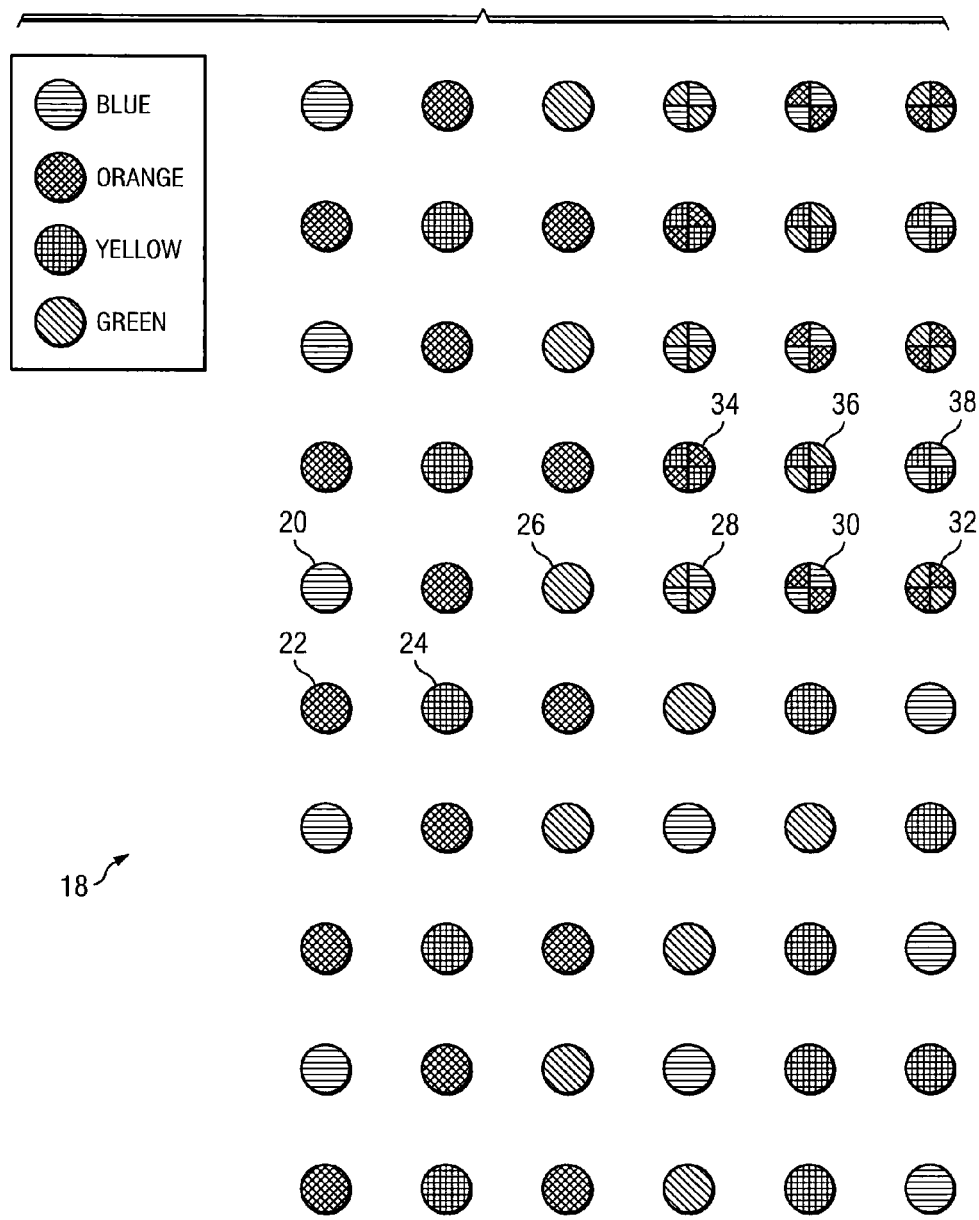
FIG. 2A illustrates a variety of marker color schemes which are interpreted by computer software.

Turning to FIG. 2A, a variety of marker color and pattern schemes 18, which are captured and then interpreted by computer software, are illustrated. Color markers 20, 22, 24, and 26, here represented in varying shades of gray, can be colors such as blue, orange, yellow, and green. Color pattern markers 28, 30, 32, 34, 36, and 38 can have similar color variations, combined with the depicted checkerboard pattern. For example, Marker 28 can include a checkerboard pattern of alternating colors green and blue.

In addition to color markers 12 serving as example embodiments of markers 12, any surface detail can be identified as a marker 12. A plurality of markers 12 can be attributed to any region of a surface which has detail with a high enough contrast. For example, on skin, markers 12 can be a scar, a mole, or a surface discoloration. In a leather jacket, marker 12 could be scratches or creases in the leather surface. On any surface that has printing (images or text), marker 12 can be any portion of the image or text which is unique in some way.

Essentially, any identifying marks which are visible can be selected as "markers" 12 and tracked in three dimensional space as though the identifying marks were color marker embodiments 12. As such, the present invention not only can identify and track color markers 12 through three dimensional space, but can track the movement and topography of any surface (in particular, a selected detail of the surface) through three dimensional space.

Figure 2B:
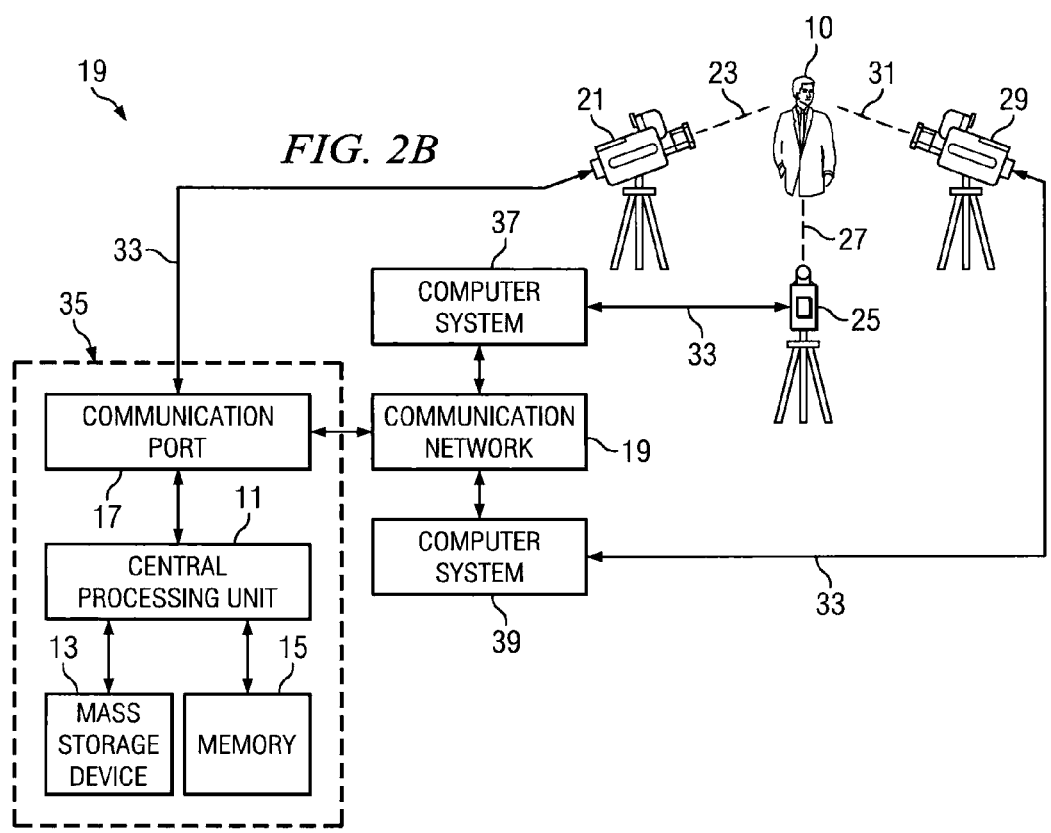
FIG. 2B illustrates a plurality of example computer systems for capturing the surface incorporating the plurality of markers.

FIG. 2B illustrates an example plurality of computer systems 19 which are networked to perform an image acquisition function of subject/surface 10. In one embodiment, a series of camera "pairs" are configured to accomplish the image acquisition. Camera 21 having an optical position 23, and camera 25, also having an optical position 27, can be configured as a first pair. Likewise, camera 29 having an optical position 31 can be configured as the first of a second camera pair, and so on. Cameras 21, 25, and 29 are connected to a series of computer systems 35, 37, and 39, via a signal bearing medium 33 as shown.

An example computer system 35 is also illustrated for reference. Computer system 35 includes central processing unit (CPU) 11, which is connected to mass storage device 13 such as a hard disk drive (HDD) or similar storage component. In addition, memory device 15 such as electrically erasable programmable only memory (EEPROM) or a similar memory component is depicted connected to CPU 11. CPU 11 is connected to a communication port 17, which is connected in turn to a communication network 19 having coupled computer systems 37 and 39. Communication network 19 can include local or wide area networks and related components (LANs, WANs), or can incorporate such protocols as universal serial bus interfaces (USB), IEEE 802.11 wireless connectivity, and the like.

In one embodiment, each computer system 35, 37, and 39 can have a minimum of one camera pair. The maximum number of attached camera pairs can ultimately depend on the speed of the respective computer system 35, 39, and 39, and its subcomponentry.

Each computer system 35, 37, and 39 can have software installed thereon which allows each CPU 11 to synchronize any attached cameras 21, 25, or 29 with every other CPU 11 in the overall system 19. In addition, one or more of the computer systems 35, 37, and 39 can have included microphones (not shown) which are attached in order to capture audio during a capture session.

In one embodiment, an additional computer (not shown) is coupled to communication network 19. The additional computer can contain software which synchronizes all of the capturing computers 35, 37, and 39, and drives the capture of the capturing computers 35, 37, and 39.

As image data is captured from the cameras 21, 25, and 29, it can be stored on the computer systems mass storage device 13 in raw format. After capture, raw data can be then processed in a series of video "proofs" that can also be synchronized with any audio recorded with the microphone(s).

Figure 3A:
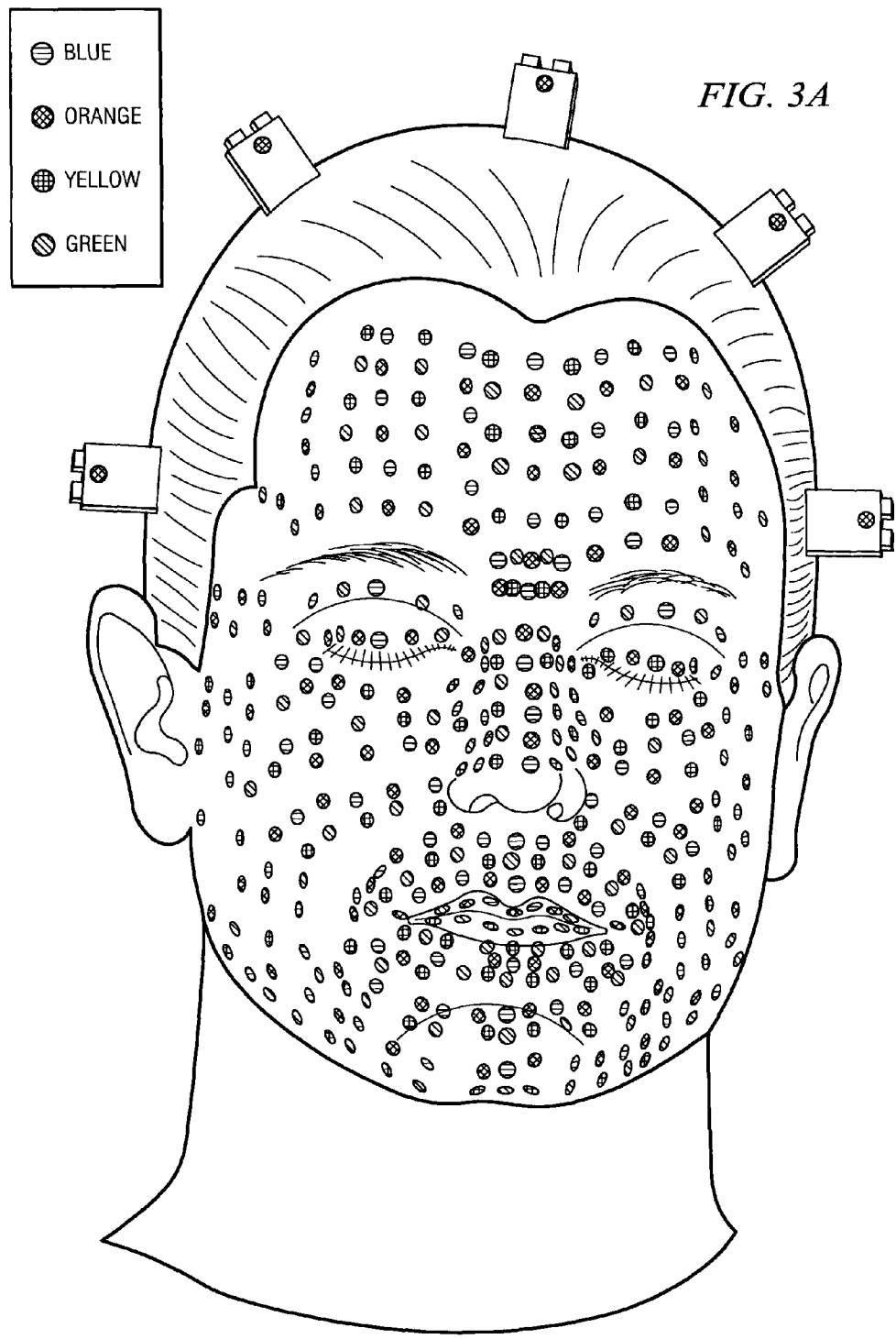
FIGS. 3A and 3B illustrate an original video capture image and a segmented capture image, respectively.
Figure 3B:
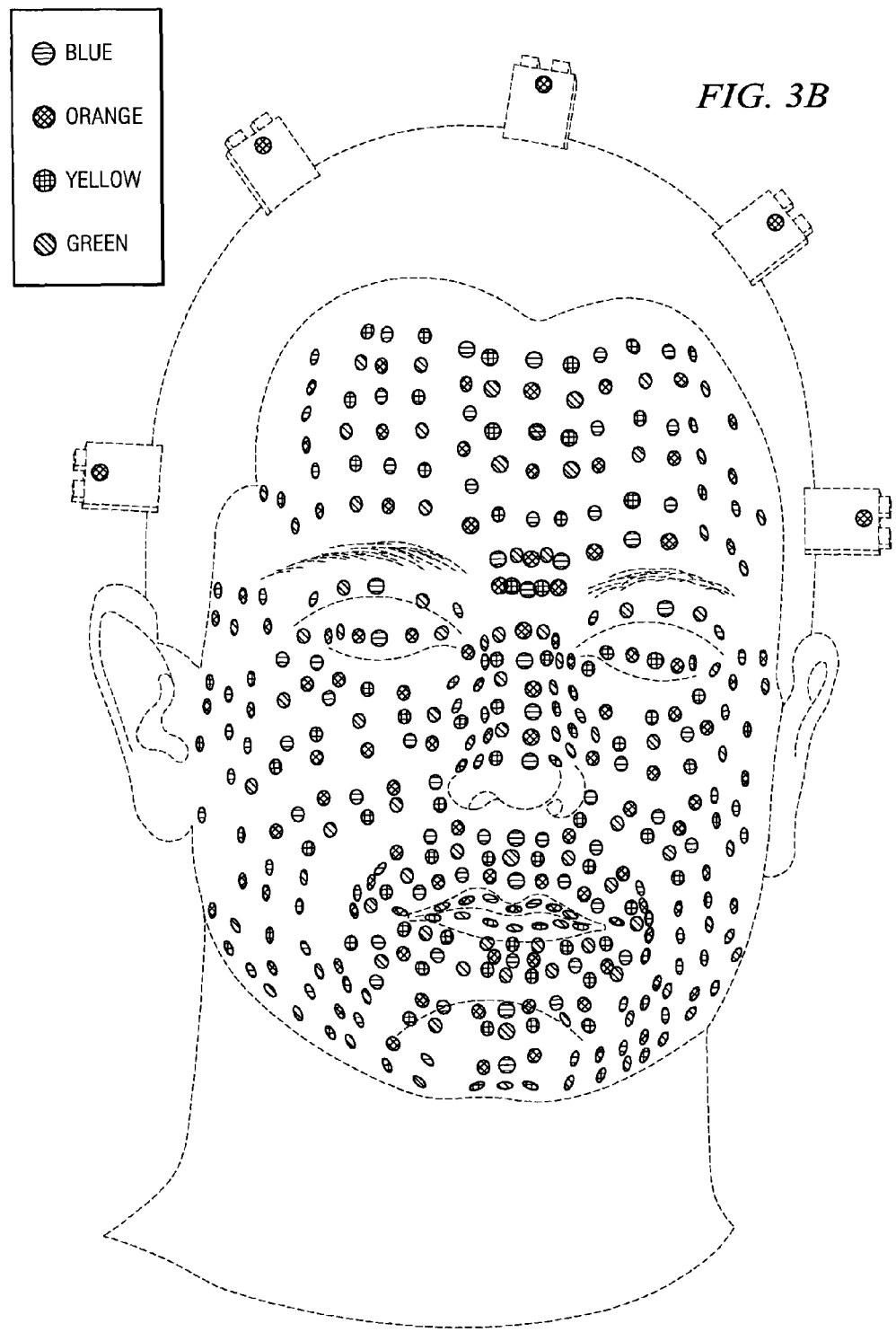

Once the data is captured, and the computer systems store the image having the incorporated marker information in a digital format on mass storage device 13, the digital information can then be processed by software executing on one or any of the computer systems previously described. As a first step, each stored "frame" of the captured video can be processed through a marker segmentation algorithm. The marker segmentation algorithm functions to better distinguish the markers 12 from the surface 10 that the markers 12 are associated with. Turning to FIGS. 3A and 3B, an original video capture image and a segmented capture image are respectively illustrated. FIG. 3A depicts the image capture of surface 10 and markers 12 in raw format. A segmented capture image is depicted in FIG. 3B. As seen, the respective markers 12 are more easily distinguishable from the underlying surface 10.

In one embodiment, for each respective color of marker, a pixel in each image frame is rated by how close the respective pixel is to the respective color. A grayscale image is thus generated having brighter regions where a selected color is prominent and darker regions where a selected color is not as prominent. The grayscale image can then be searched for "islands" of bright regions or areas of higher density checkerboard pattern corners. The islands can then be tagged as markers 12 of the selected color.

In an embodiment of the present invention where surface detail as previously described is used as markers 12, the processing step of passing the markers 12 through a segmentation algorithm can be bypassed. Instead, optical flow tracking information as will be further described can form an initial guess as to an individual marker 12 position in three dimensional space.

Figure 4:
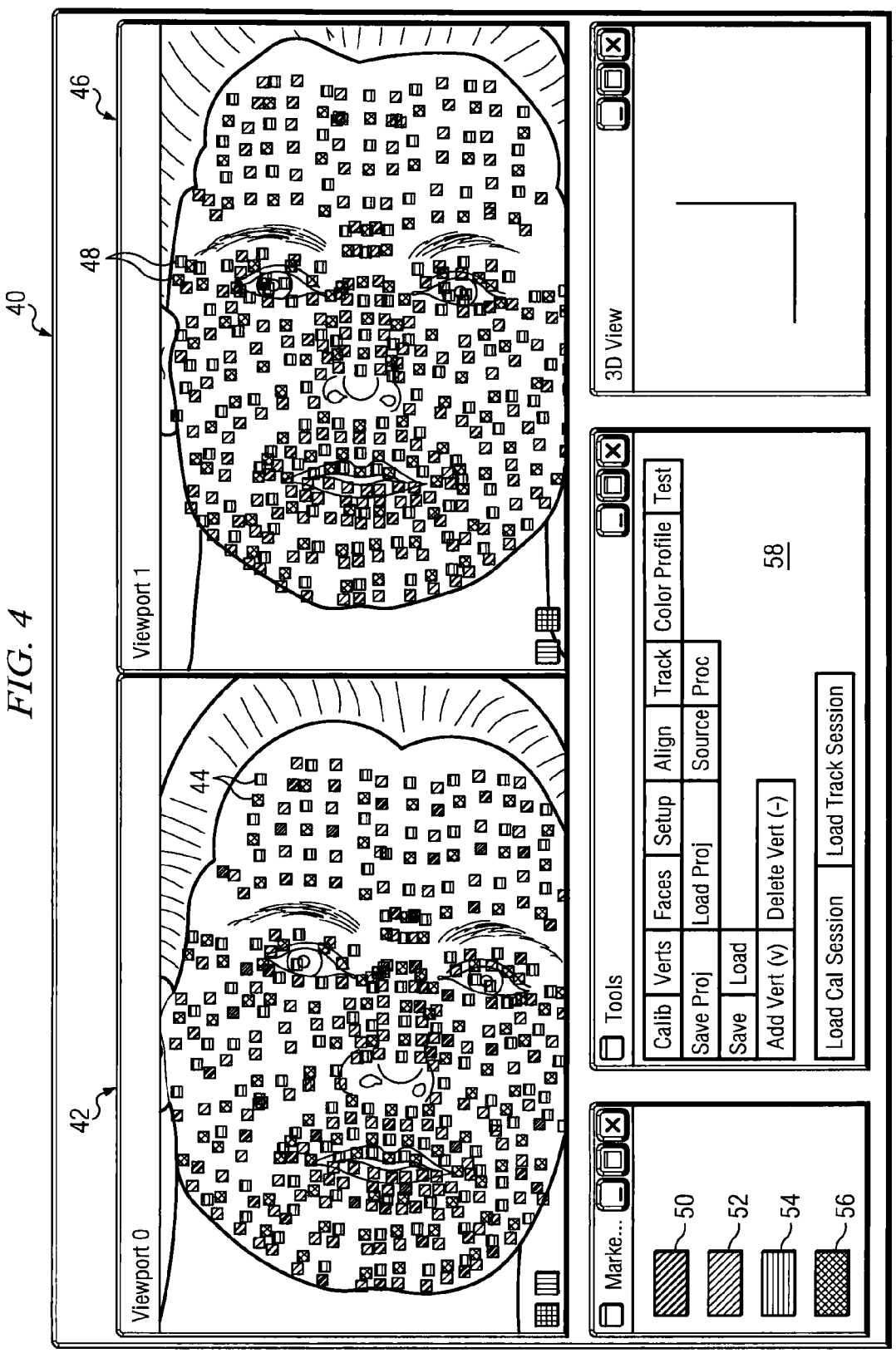
FIG. 4 illustrates the identification of a plurality of markers for a camera pair in a graphical user interface (GUI)

Turning to FIG. 4, the identification of a plurality of markers for a camera pair in a graphical user interface (GUI) 40 is illustrated. Window 42 shows a first representation from the first of a dual camera pair. Each of the plurality of squares 44 indicates selected and recognized markers 12 of a specific color. Similarly, window 46 shows a second representation from the second of the dual camera pair, with squares 46 indicative of the recognized markers 12 of various colors. Shown below windows 42 and 46 are the respective colors green 50, olive 52, blue 54 and orange 56 which are being used in the depicted embodiment. Also depicted is tools menu dialog box 58 which allows a user to select one of a variety of menu selections to perform image processing functions as will be described.

Certain markers 12 or points in each image 12 can be identified in each image frame which are more easily tracked to a succeeding image frame using an optical flow technique. Each of the identified markers 12 are tracked in a succeeding image frame. Any markers 12 which are unable to be located can be discarded. A collection of finalized markers 12 can be then geometrically triangulated into a two-dimensional mesh representation. Each of the identified markers 12 can be then stored in memory.

Figure 5:
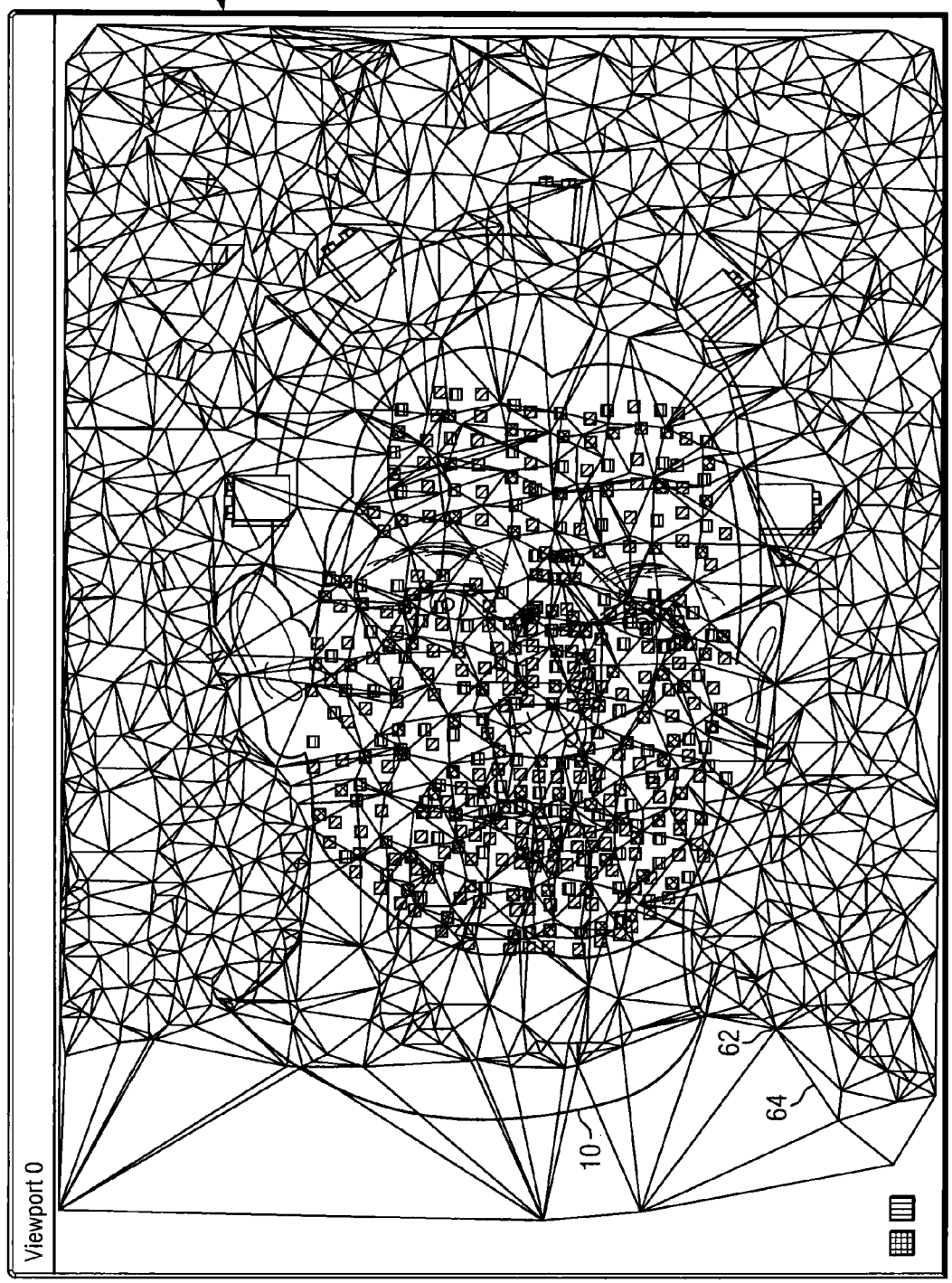
FIG. 5 illustrates a triangulated optical flow tracking mesh in a GUI environment.

FIG. 5 illustrates a triangulated optical flow tracking mesh 60, again in a GUI environment of a respective image frame of surface 10. A plurality of selected markers 12 are geometrically triangulated with lines 62 and 64 as examples.

Figure 6:
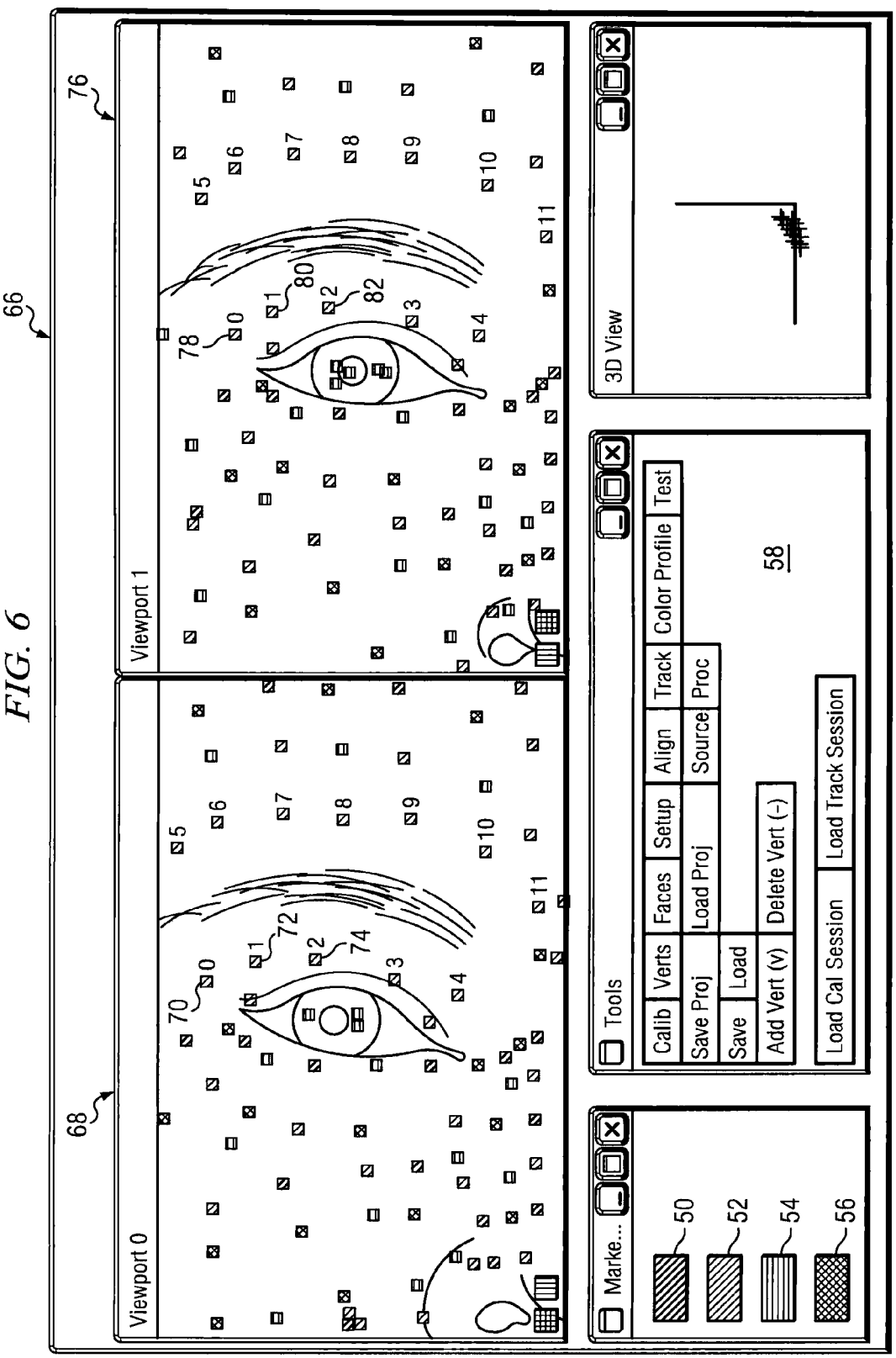
FIG. 6 illustrates a plurality of correlated markers in a GUI environment.

Before motion can be tracked, a three-dimensional representation of a surface 10 can be generated. Identified markers 12 identified in each image representation of a camera pair can be correlated in a step to the ultimate generation of the three-dimensional representation. Turning to FIG. 6, a plurality of correlated markers 66 in a GUI environment is illustrated. Again, window 68 represents a first image representation of a dual camera pair. Selected correlated markers 70, 72, and 74 are denoted with reference numbers 0, 1, and 2 for reference of a user. The markers 70, 72, and 74 and correlated with markers 78, 80, and 82 as seen in window 76, the second image representation of the dual camera pair. The correlation can then be used to create a three-dimensional marker point of the markers which is projected from each camera of the dual camera pair. This three-dimensional marker point can be referred to as a "tracking point" as will be further described.

Figure 7:
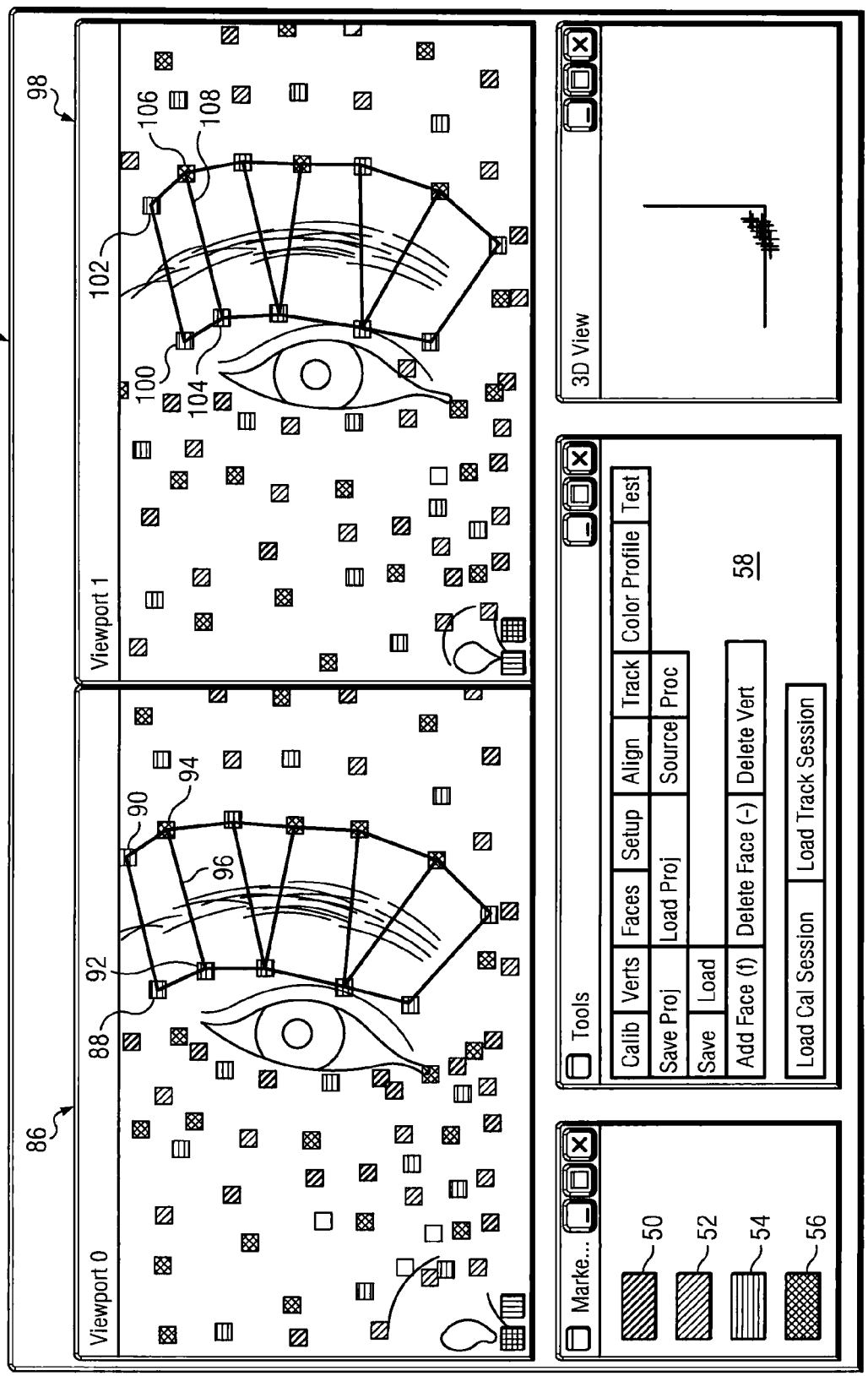
FIG. 7 illustrates generating connectivity data for the plurality of correlated markers of FIG. 6.

In a next step, connectivity data associated with each tracking point can be identified, which creates a three-dimensional mesh representation of the marked surface 10 to capture. FIG. 7 illustrates the process of generating connectivity data for the plurality of correlated markers of FIG. 6, resulting in a three-dimensional mesh representation 84 in each image representation of the dual camera pair. Window 86 again represents the first image representation, having tracking points 88, 90, 92, and 94, which are geometrically connected with connectivity lines 96 as shown.

In one embodiment involving a facial surface 10, a user can specify which tracking points will be used to track a region around the eyes. In addition, the user can specify so-called "alignment tracking points" which can be used to estimate an overall orientation of an object 10 or element of an object 10. The respective markers 12 utilized by the alignment tracking points are intended not to be distinguishable over other markers 12, other than the alignment tracking points having been selected by a user.

In a separate embodiment, upon the first image frame of a capture, a user can identify which markers 12 have been previously identified as alignment tracking points. The overall system 19 can use the markers 12 to do a first, "best guess" alignment of the markers 12/tracking points with the surface 10 being captured.

During a motion tracking sequence, each of a dual camera pair can be handled on an individual basis. The user can step through each of a series of animation image frames on a frame-by-frame basis, identifying errors in a respective tracking solution in each animation image frame.

As a next step, each selected tracking point from a previous frame can be transformed from a world space to a local space of the surface 10, the local space being defined by the alignment points. Then, in the current image frame, the previous position of the alignment tracking points can be used as a starting point to search for appropriate associated markers 12. Optical flow information, calculated previously, can be used to determine where a respective marker 12 moves from image frame to succeeding image frame. If a marker 12 is not identified in the new image frame at a respective position (where the marker 12 is to be expected), then the marker 12 position from the previous image frame can be used to determine the alignment of surface 10 and promote the proper flow from image to image.

Once the optical flow information is generated, each respective alignment tracking point can be transformed back into world space from the local space of surface 10. The optical flow information can then be used again to track the movement of each tracking point as the tracking point moves from frame to frame.

Figure 8:
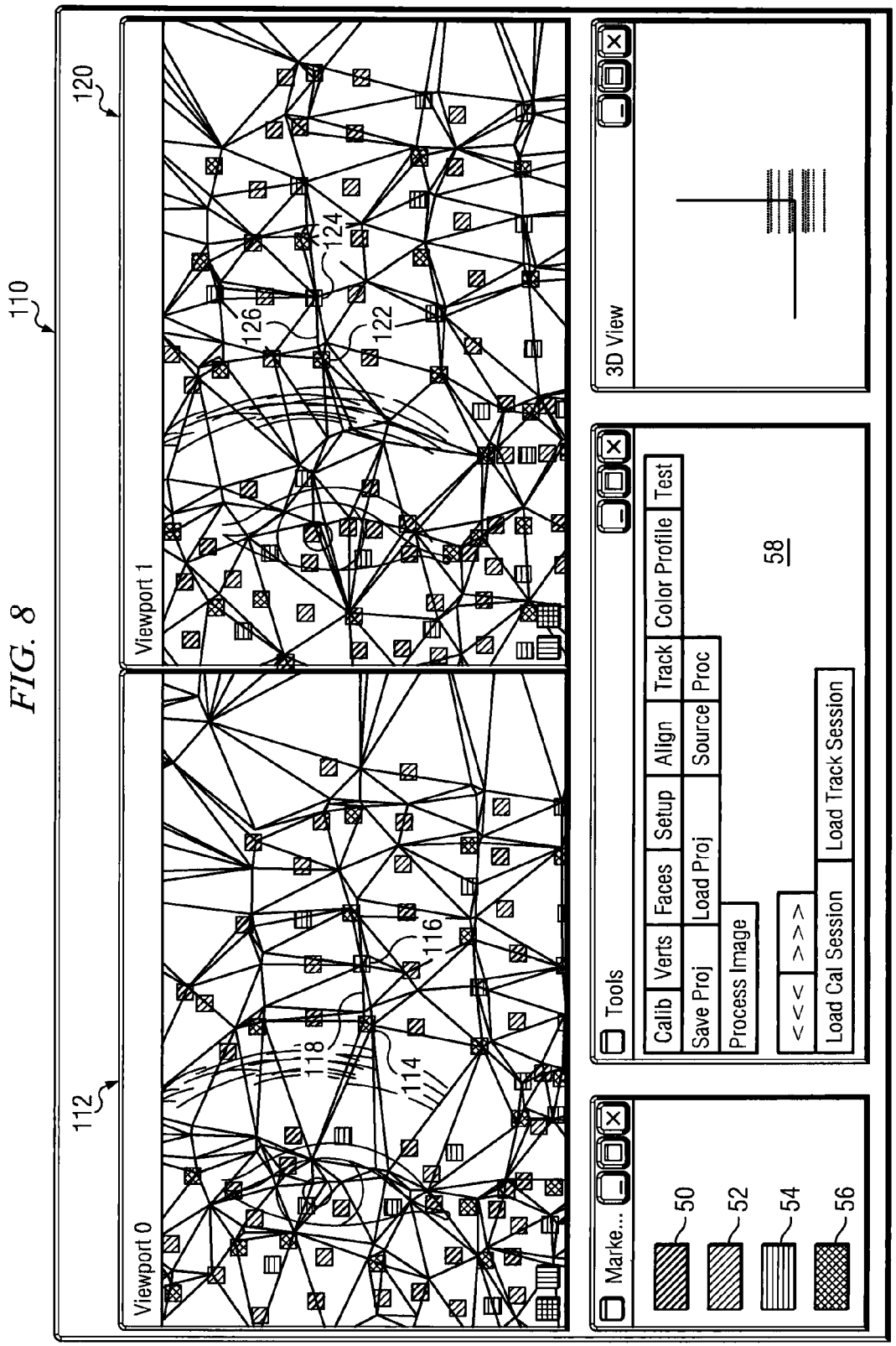
FIG. 8 illustrates the calculation of optical flow from a first image frame to a second, succeeding image frame, again in a GUI environment.

Turning to FIG. 8, the calculation of optical flow information 110 from a first image frame to a second, succeeding image frame is depicted, again in a GUI environment. Window 112 represents a first image representation in the first of the dual camera pairs. Markers 114 and 116 represent the selected alignment tracking points 114, 116, which are geometrically connected in a three-dimensional web representation using lines 118. Lines 119 represent depicted optical flow information from a first image frame to a second, succeeding image frame. Window 120 correspondingly depicts the representation from the second of the dual camera pairs, showing alignment tracking points 122, 124, connecting line 126, and optical flow lines 127.

As previously described, the calculation and tracking of optical flow can be a first initial guess for the position of markers 12 which are selected from surface detail such as a skin discoloration. As a next step, a predefined window surrounding the marker 12 detail can be searched to estimate optical flow position for a matching pattern.

If the optical flow information does not identify a suitable marker 12, then the updated world space position can be projected into a respective camera frame. A search can then be conducted of the region for nearby markers that are matching in color, texture, or pattern.

If a suitable marker is not found, then the previous image frame's position can be used to interpolate a "best guess" position by using translation information of markers 12 which are geometrically connected (via the three-dimensional mesh) to a respective marker 12.

If a user identifies errors in the tracking solution, several tools can be used to correct errors, which are incorporated according to the present invention to suit a particular application. In an example first error correction technique, a projected tracking point can be dragged in a first camera image until a second, matching marker is overlapped. The dragged path can then be locked into the system 19, preventing the matching marker from being used from another tracking point. In a first camera image, a line can be projected from the fixed marker 12 in a first camera into the view of the second camera in the pair. The projected line can be used to find the accompanying paired marker 12 since, generally, the marker 12 should lie along the line to be correct. If no marker is found, the previous frame's tracking point can be projected into the image. The closest point from the tracking point to the projected line can be used as the appropriate marker 12 position for a respective image frame.

In an example second error correction technique, if a respective tracking point is marked as unsolvable for a respective image frame, a conclusion can be reached that no appropriate markers 12 are to be identified. As a result, the final position of the tracking point can be calculated using the same tracking algorithm as a tracking point that was unable to locate an appropriate marker 12 in a succeeding image frame. The second example technique can be used if the markers 12 are not visible, and a computer system 35 is misidentifying the markers 12 for a tracking point.

In an example third error correction technique, a tracking point can be fixed in three-dimensional space. A respective tracking point can be moved in two dimensions. The final position can be calculated by projecting a line in the paired image, and selecting the point closest to the line from the original projected position of the marker 12. Alternatively, the respective tracking point can be moved in a camera image frame and constrained along the line projected from a current tracking point to the paired, second camera.

Figure 9:
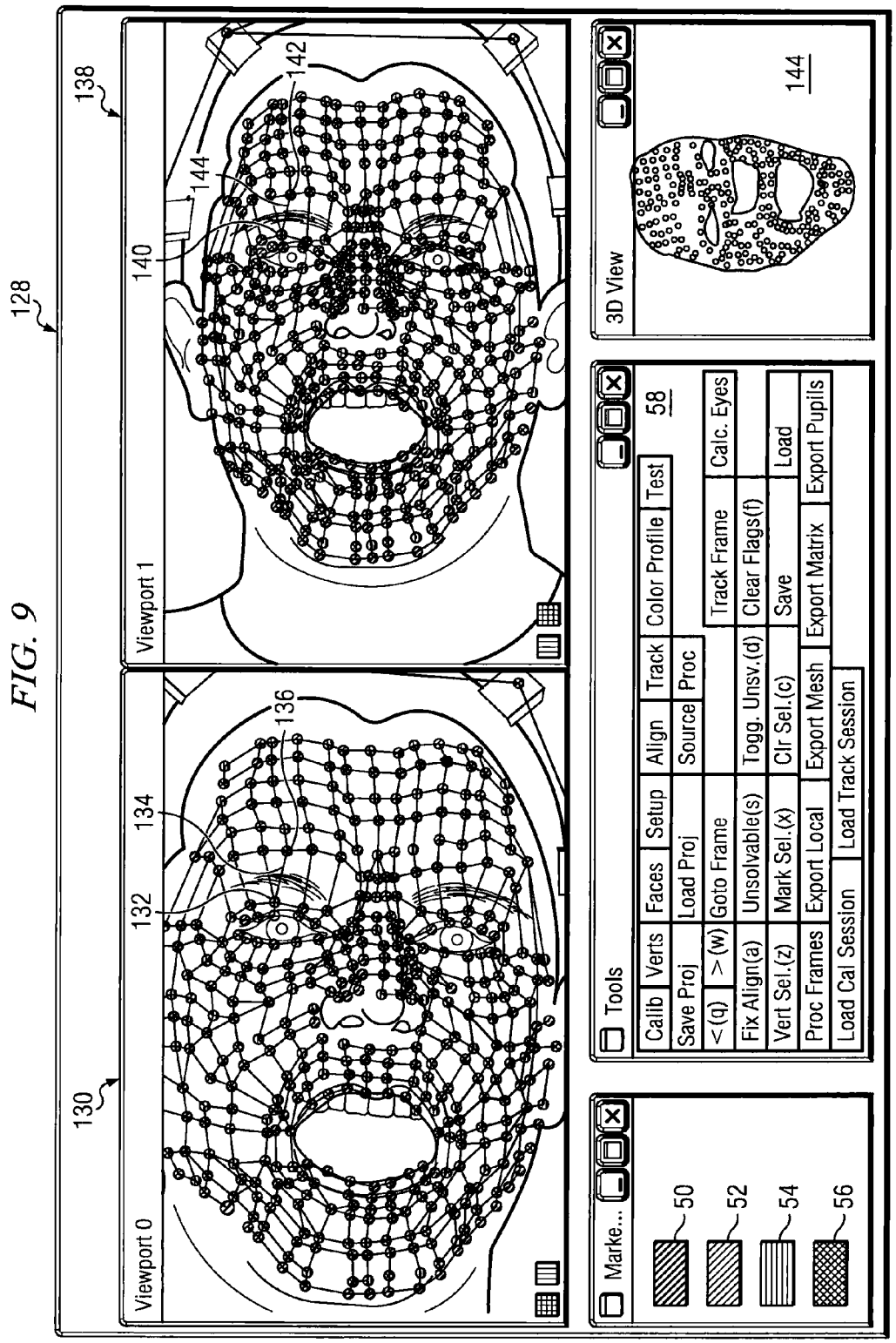
FIG. 9 illustrates an image pair rendered after tracking and editing according to the present invention in a GUI environment.

Turning to FIG. 9, an image pair 128 rendered after tracking and editing according to the present invention in a GUI environment is illustrated. Windows 130 and 138 depict the respective first and second image representations of a camera pair. A connective, three-dimensional mesh is provided via connective information 136, 144. Alignment tracking points 132, 140 represent tracking points which have been corrected according to a corrective technique previously described. Alignment tracking points 134, 142 represent tracking points which have been automatically tracked from a first image frame to a second, succeeding image frame.

A technique can be implemented according to the present invention to track the movement of the pupil of an eye. An "eye tracking point" region can be selected by a user, resulting in a square bounding box which surrounds a designated eye region. The internal area of the square bounding box can be searched for pits and circles. If a pit is located, the pit is identified and designated as a pupil. If a pit is not identified, but a circle is located, the center of the circle can be used as the pupil. If the pupil is identified in each image of the camera pair, the three-dimensional position can be triangulated and the data stored in system 19.

Additionally, pupil tracking can implement one or more methods previously described in the second and third example corrective techniques.

Once surfaces have been tracked successively in each camera pair, a final mesh can be reconstructed using the tracked data of each point from the camera pairs. If a tracking point is identified in more than one camera pair, the data from the most accurate camera can be used (generally the camera closest to the surface 10).

Figure 10:
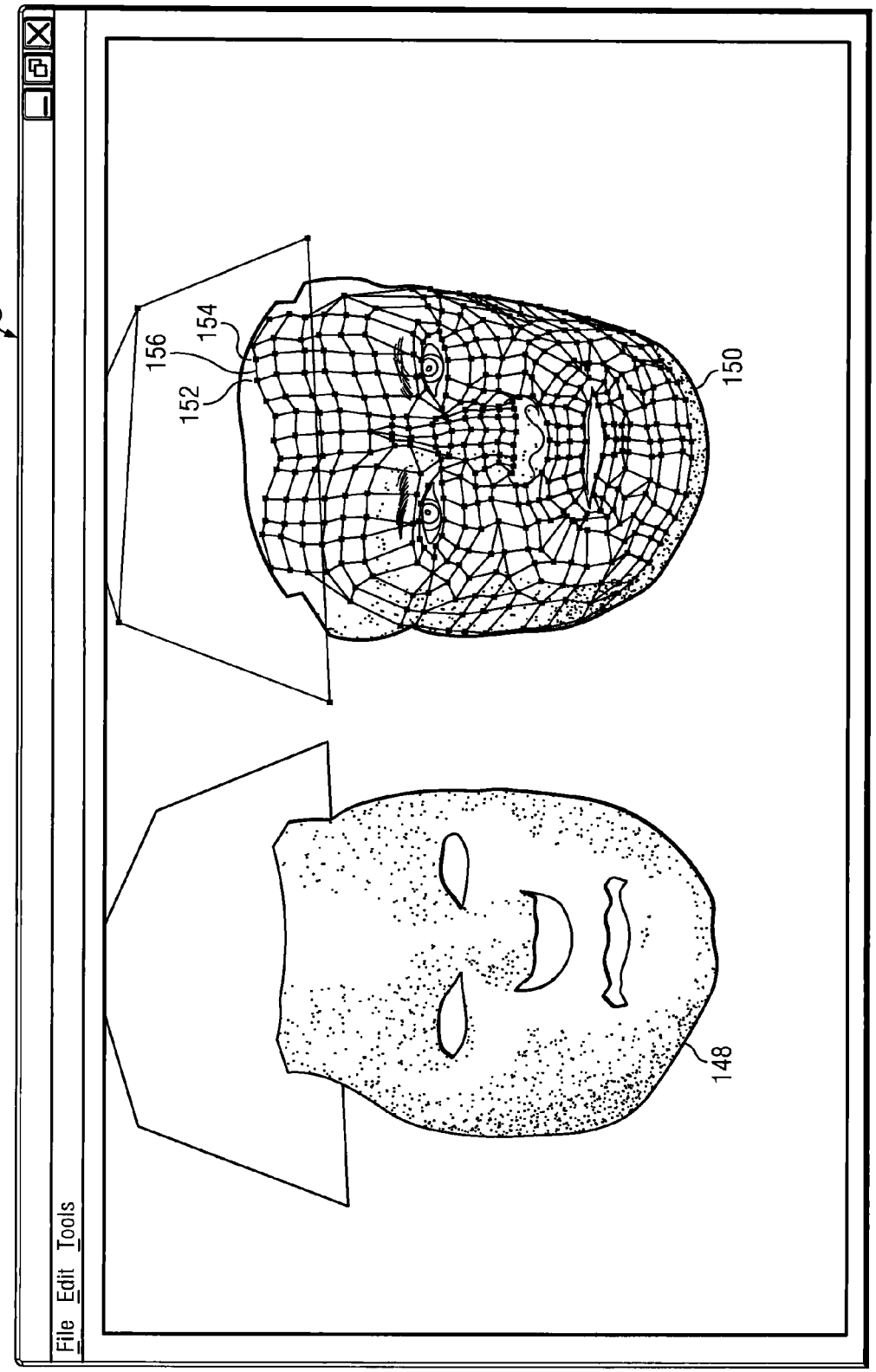
FIG. 10 illustrates original raw motion capture data accompanying remapped final vertices onto a different human face.

Captured tracking data, once converted to animation using the foregoing techniques, can be applied to any model. To do so, the data is retargeted. Retargeting is accomplished by first aligning the tracked mesh from a neutral pose to the model to be animated, again in a neutral pose. Computer software can then be used to "stick" the animated surface to the surface of a new target. FIG. 10 illustrates original raw motion capture data accompanying remapped final vertices onto a different human face in a GUI environment 146. As such, original raw motion capture data 148 is seen displayed on the left side of the interface, while the remapped information is displayed affixed to a new model/target 150, displayed on the right side of the interface. A delta mesh having tracking points 152, 154 connected by lines 156 assists animation software to appropriately line up the plurality of tracking points 152, 154, etc., with the new surface 150.

Figure 11:
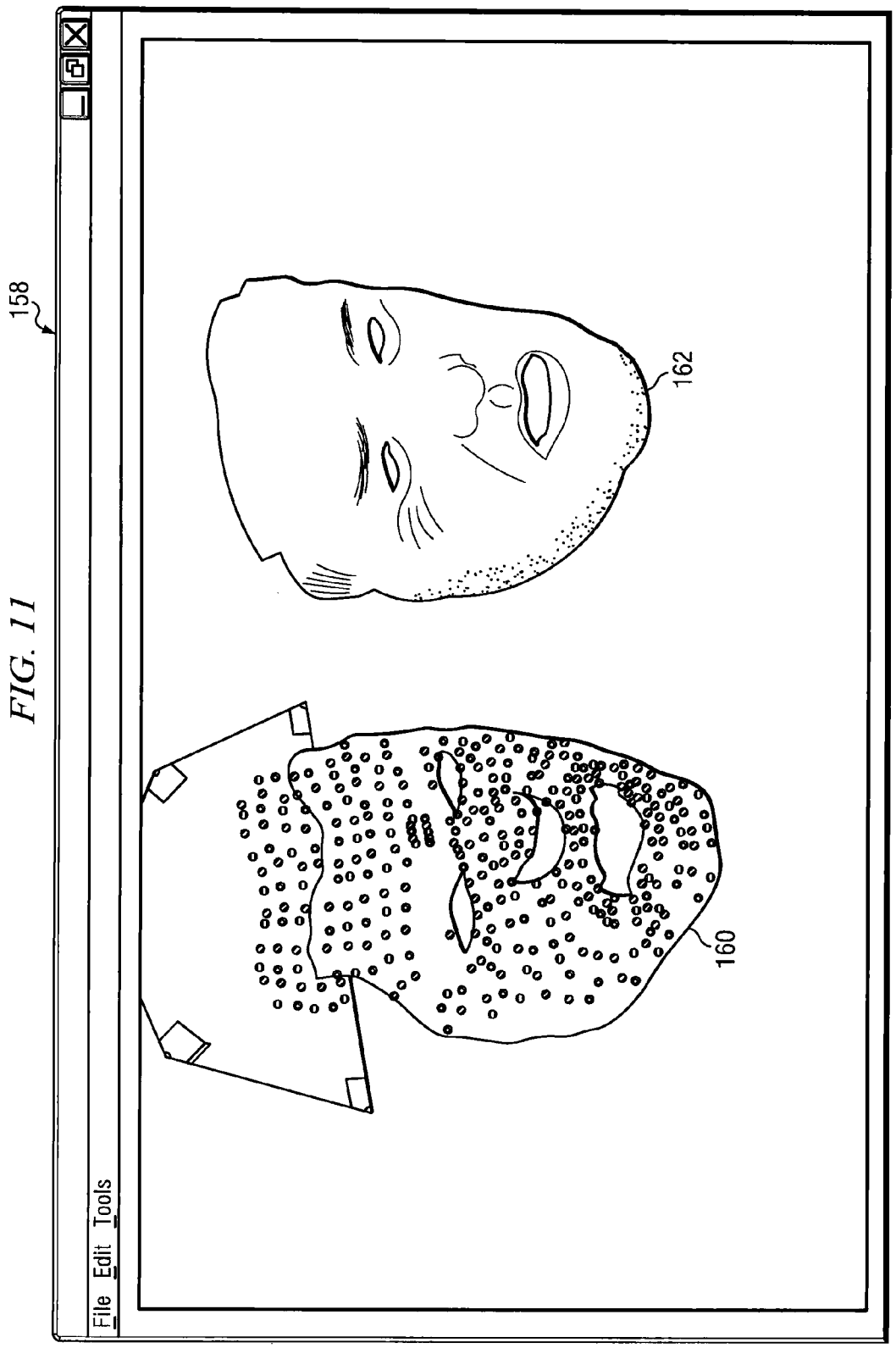
FIG. 11 illustrates original raw motion capture data accompanying a retargeted and final skinned mesh.

Once the mesh has been retargeted, the mesh can be applied to the target via a method termed "skinning." A skinning method provides vertices of the target model information about how the vertices will move relative to respective tracking points. The amount of influence any particular tracking point has over a vertex in the source mesh is determined by the distance along the surface of the mesh from a respective tracking point to the vertex to be animated. As a result, multiple tracking points can influence any single target vertex. To illustrate, FIG. 11 depicts original raw motion capture data 160 accompanying a retargeted and final skinned mesh 162 in a GUI environment 158.

FIG. 12 illustrates an example method 160 of capturing, storing, and preparing an image for further processing according to the present invention. Method 160 begins (step 162), by a user placing markers on a surface (step 164). The respective camera pair(s) are configured (step 166) as described. The capture data is stored in raw format (step 168). The video frame(s) is processed through a marker segmentation algorithm (step 170) to distinguish the markers from the surface 10. A plurality of two-dimensional tracking points are identified (step 172), then geometrically triangulated into a two-dimensional mesh representation, where tracking points coupled with the optical flow tracking information is stored (step 174).

As a next step, a three-dimensional representation of the surface is generated (176) using the tracking point data and optical flow information. The respective markers/tracking points are correlated in each image of the dual camera pair (step 178). A plurality of three-dimensional tracking points are generated from the correlated markers (step 180). In addition, geometrical connectivity data is derived for each selected three-dimensional tracking point, which is then identified as such (steps 182, 184). Method 160 then ends (step 186).

Figure 13A:
FIG. 13 is a flow chart diagram of an example method of utilizing tracking points from a first image frame through succeeding image frames according to the present invention.
Figure 13B:
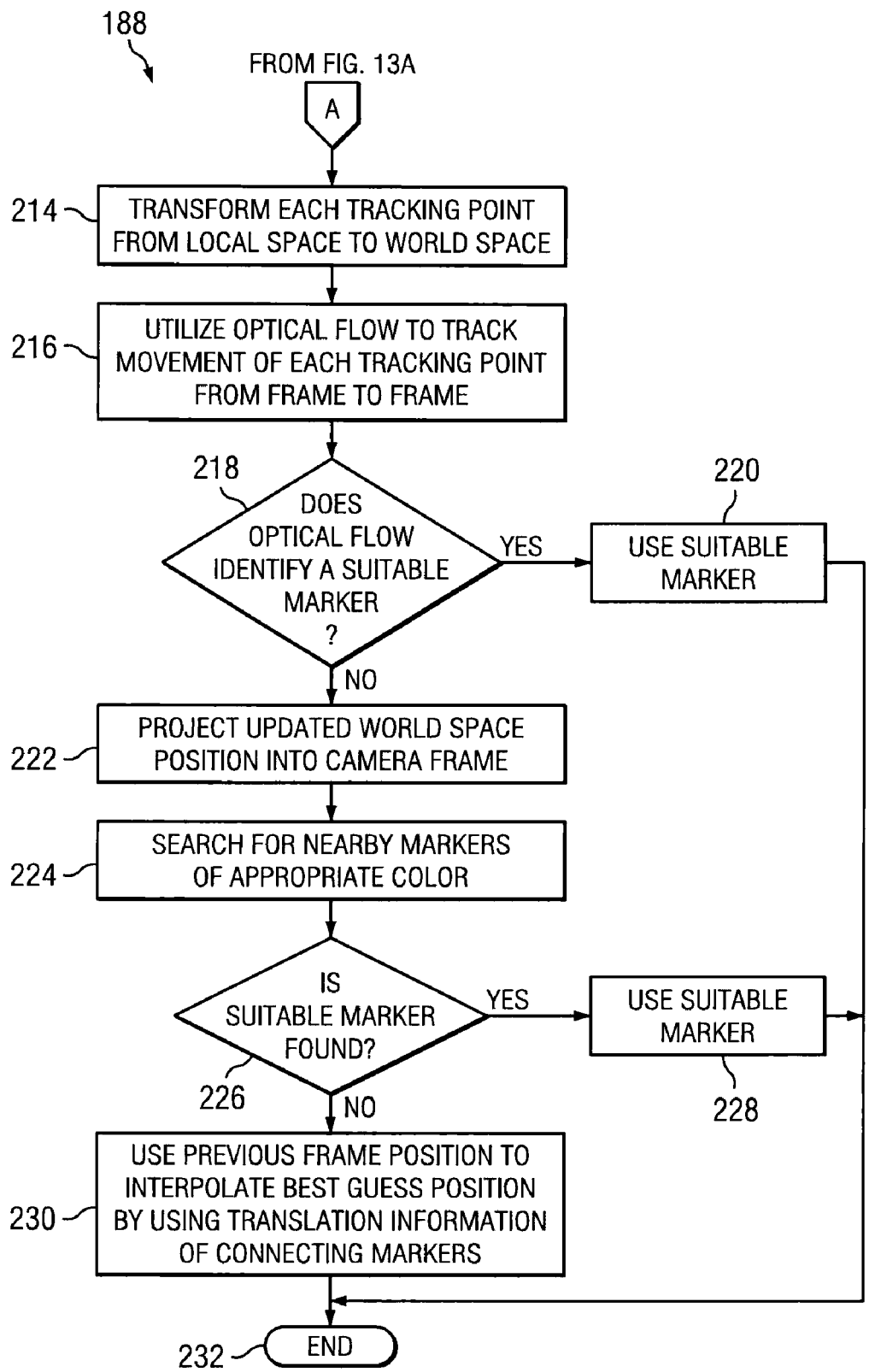

FIG. 13 is a flow chart diagram of an example method of utilizing tracking points from a first image frame through succeeding image frames according to the present invention. In addition, FIG. 13 illustrates an example method 188 of conducting a tracking function, as well as incorporating example corrective fix techniques according to the present invention. Method 188 begins (step 190) with the identification and designation of markers which were previously identified as alignment tracking points in method 160 (step 192). If a succeeding marker 12 is not identified, the step 194 of performing a "best guess" alignment of the tracking points is included as an option.

A respective tracking point from a previous image frame is transformed from world space to local space (step 196). A previous position of the tracking point is utilized to search for appropriate succeeding markers 12 (step 198) as a possible option. Either with, or without the assistance of optional steps 194 and/or 198, each marker/tracking point is attempted to be located where the marker moved from frame to succeeding frame (step 200).

If a marker 12 exists in the new position (step 202), the marker is reused in the new position (step 204). Otherwise, a defined region surrounding the previous marker's location is searched for matching markers of suitable color, texture, or pattern (step 206). If a suitable match is found (step 208), the suitable marker 12 is used (step 210). If not, the marker 12 position from a previous frame is used to determine the proper alignment (step 212).

Once a suitable marker is identified and designated, each tracking point is re-transformed from local space to world space as previously described (step 214). The optical flow information previously described is again reutilized to track the movement of each tracking point from frame to frame (step 216).

As an additional and optional corrective measure, if the optical flow information identifies a suitable marker (step 218), then the suitable marker 12 is utilized in the succeeding image frame (step 220). Alternatively, the world space position is projected into the camera frame (step 222). A defined region is searched for matching markers 12 (step 224). If a suitable marker is found, the marker is utilized (step 228). If not, the previous frame's position is used to interpolate a "best guess" position by utilizing translation information of geometrically connected markers 12 (step 230). Method 188 then ends.

Figure 14:
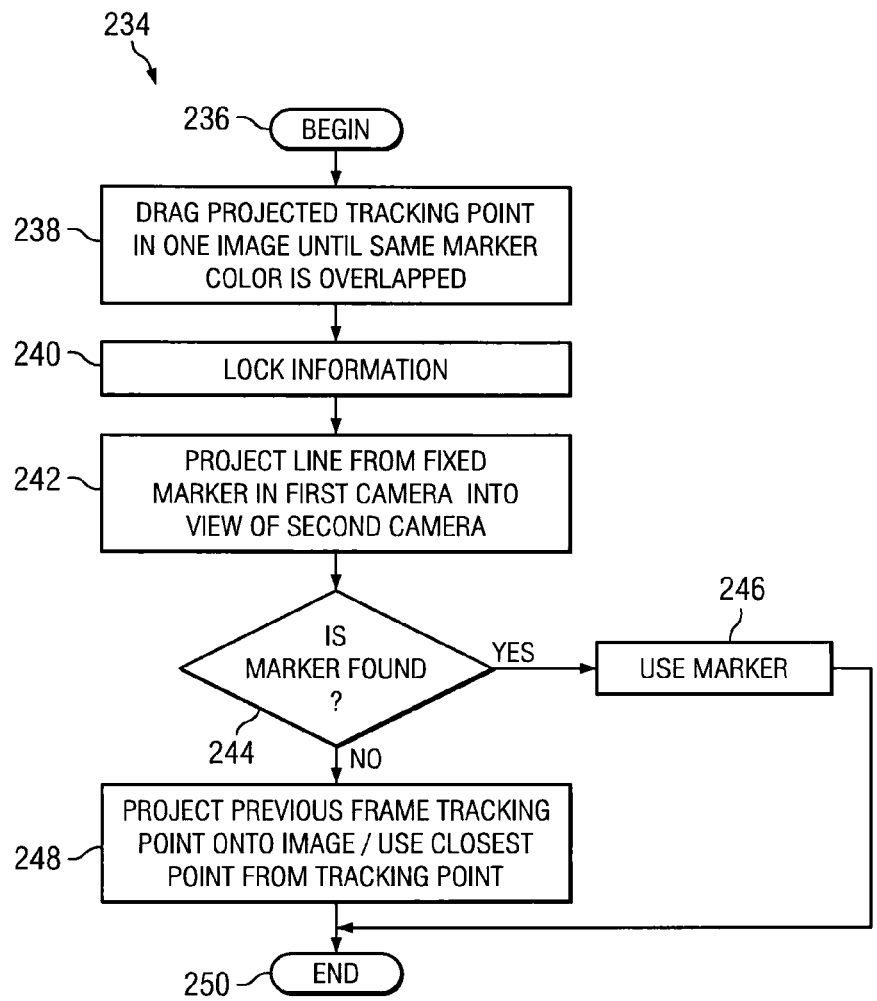
FIG. 14 is a flow chart diagram of a corrective technique to identify tracking points from a first image frame through successive image frames according to the present invention.

Finally, FIG. 14 is a flow chart diagram of an optional corrective technique 234 to identify tracking points from a first image frame through successive image frames according to the present invention. Method 234 begins (step 236) by moving a projected tracking point in a first image representation until a matching marker is overlapped in a second image representation (step 238). The information is then locked to prevent the matching marker 12 from being used by an additional tracking point (step 240).

Next, a projected line is projected from a fixed marker 12 in the first camera into view of the second camera in the pair (step 242). If the marker 12 is located (step 244), the marker 12 is used in the succeeding image frame (step 246). If not, the previous frame's tracking point information is projected onto the image representation. The closest point in a designated region from the tracking point to the projected line is used in the succeeding image frame (step 248). Method 234 then ends (step 250).

Figure 15:
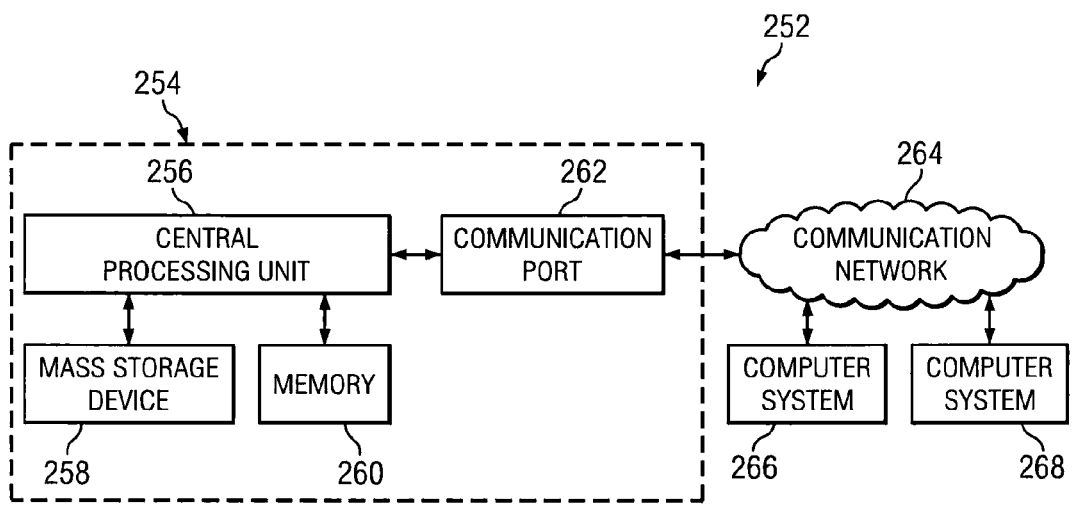
FIG. 15 is an example computer system upon which various aspects of the present invention can be executed and otherwise implemented.

Turning to FIG. 15, an example computer system 252 is shown upon which various aspects of the present invention can be implemented, such as execution of various steps of the foregoing method 234. An individual workstation 254 includes a central processing device (CPU) 256 for executing various capturing, processing and rendering steps as described, mass storage device 258, and memory device 260 for storing image representations, and a communication port 262 for linking the workstation 254 over a communication network 264 to a remote computer system 266, 268. As one skilled in the art will appreciate, the foregoing methods can be implemented in a variety of ways using similar computing equipment to suit a particular application.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of capturing and processing a series of images incorporating a plurality of digitized markers, comprising:
   capturing a first image frame with a first video camera having a first optical position to generate a first image representation;
   locating a position of a first digitized marker in the first image frame;
   searching for the first digitized marker in a second, succeeding image frame;
   when the first digitized marker is not found in the second, succeeding image frame, interpolating a best guess position of the first marker in the second, succeeding image frame by processing translation information of a second marker geometrically interconnected to the first marker; and
   processing the first image representation through a marker segmentation algorithm to obtain a first image segmentation representation.

2. The method of claim 1, wherein the plurality of interconnected digitized markers are generated in a three-dimensional mesh representation.

3. The method of claim 1, including capturing the first image frame with a second video camera having a second optical position to generate a second image representation.

4. The method of claim 3, including synchronizing the first and second image representations to generate a composite image representation representing correlated first and second image representations.

5. The method of claim 1, wherein the plurality of digitized markers vary in texture or color.

6. The method of claim 1, wherein the first marker and the second marker match in color or texture.

7. A computer-implemented method of capturing and processing a series of images incorporating a plurality of digitized markers, comprising:
   capturing a first image frame with a first video camera having a first optical position to generate a first image representation;
   capturing the first image frame with a second video camera having a second optical position to generate a second image representation
   locating a position of a first digitized marker in the first image frame;
   searching for the first digitized marker in a second, succeeding image frame;
   when the first digitized marker is not found in the second, succeeding image frame, interpolating a best guess position of the first marker in the second, succeeding image frame by processing translation information of a second marker geometrically interconnected to the first marker;
   dragging a projected tracking point in the first image representation until a third, matching marker is overlapped;
   locking the first image representation to prevent further use of the third, matching marker; and
   projecting a line from the third, matching marker in the first image representation into view of the second image representation, wherein if a fourth marker is identified along the line, the fourth marker is used in the second, succeeding image frame of the second image representation, and if the fourth marker is not identified:
   utilizing the closest, fifth marker from the projected tracking point in the first image representation to the projected line in the second, succeeding image frame.

* * * * *